United States Patent Office 3,305,787
Patented Feb. 21, 1967

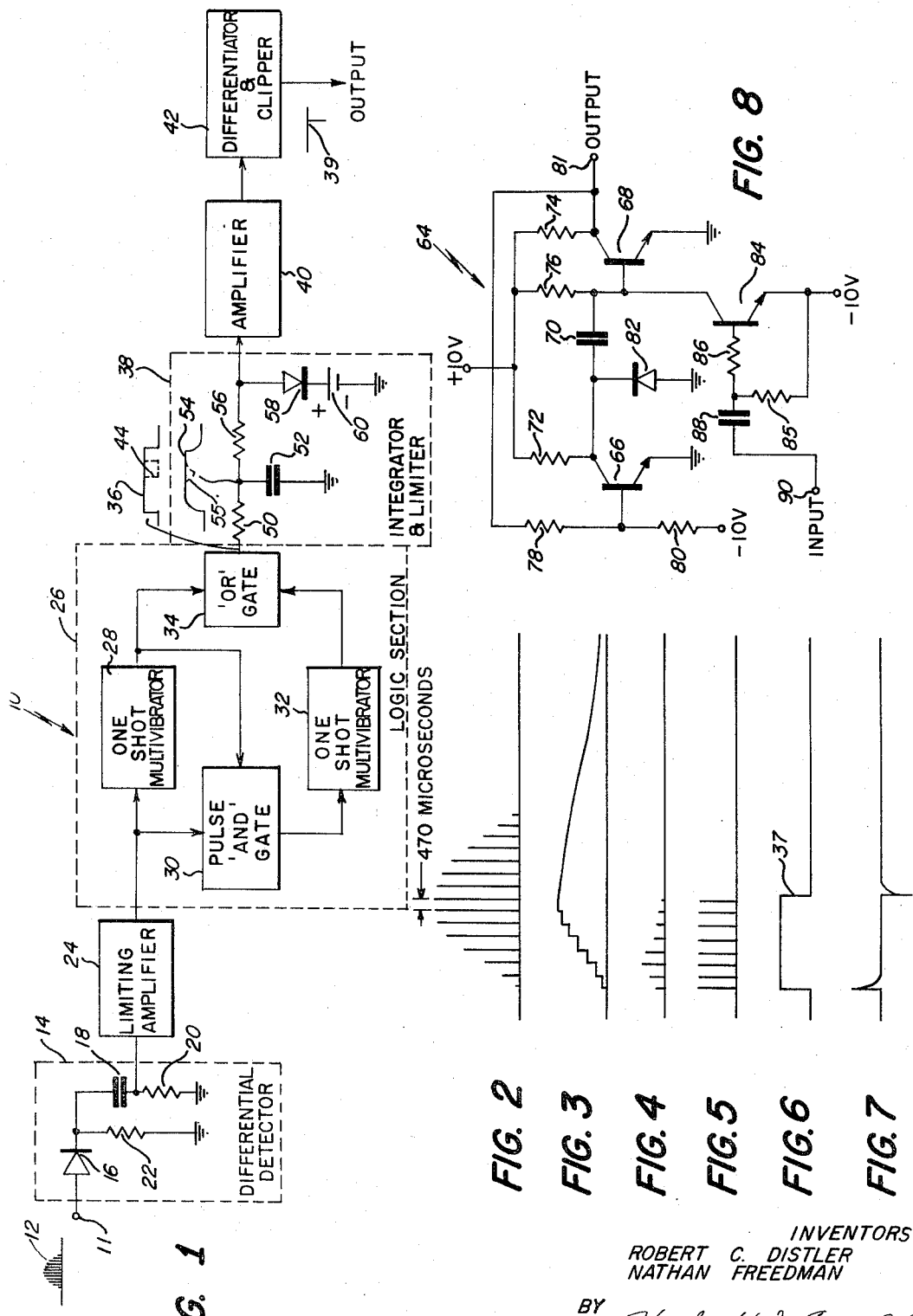

3,305,787
PEAK AMPLITUDE PULSE TIME DETECTING
CIRCUIT
Robert C. Distler, Sudbury, and Nathan Freedman, West Newton, Mass., assignors to Raytheon Company, Lexington, Mass., a corporation of Delaware
Filed June 18, 1963, Ser. No. 288,789
6 Claims. (Cl. 328—151)

This invention relates to arrangements for determining the time of reception of a particular portion of an electromagnetic energy signal and, more particularly, to means for identifying the center or peak of a series of pulses, such as those of a fan beam signal.

In applications, such as in radar and direction-finding systems which utilize a scanning-type antenna in which the pulse repetition frequency is greater than the scanning rate, it is frequently necessary to determine the time of occurrence of the maximum amplitude of the received signal which is represented by a series of pulses which commences when the leading edge of the scanning or fan beam first intercepts a receiving antenna and terminates when the trailing edge of the beam sweeps past the receiving antenna. Because of the sweeping of the beam past a receiving location, successive pulses at the location will vary in amplitude in a manner which approximates a gaussian distribution; that is, the first received pulses of the group will be low in amplitude as the antenna beam leading edge intercepts the receiving antenna, the later received pulses will progressively increase in magnitude as the center of the beam approaches the receiving antenna, and then the magnitude of the pulses will decrease as the trailing edge of the beam sweeps past the receiving means. In scanning systems where it is required that the exact azimuth information be determined, and, in particular, in systems in which the information is handled by means of digital processes, it is desirable that the system produce a single output pulse which is indicative of the center of the series of pulses making up the fan beam, and in radar applications wherein a series of pulses is received after reflection from an object, the exact azimuth position of a detected object.

It is therefore a general object of this invention to provide an improved peak-time detecting circuit.

It is a further object of this invention to derive from a series of pulses, such as received pulses which are produced when a scanning antenna beam sweeps past a remotely located receiving system, an output pulse which is accurately related to the peak or center of said series of pulses. Also, in connection with a return echo pulse from a reflecting object, the aforesaid peak-time detecting circuit may be utilized to provide a single pulse indicative of the position of the beam when it is substantially centered on a detected object.

In accordance with this invention, a signal, such as a video signal represented by a series of waves or pulses, is operated upon and monitored to provide an output signal which indicates substantially the time of the peak amplitude of said series of pulses. In particular, detection of the center, or some constant reference point of a burst of pulses relatively independent of variations in amplitude or beam width, is achieved by applying the pulses, such as produced by a scanning beam, to a detecting circuit which provides a plurality of charging pulses of substantially ascending amplitude during the rising portion of the beam, the pulses terminating at the point of maximum amplitude by means of a capacitor in a differential detector which monitors the charging current pulses which cease at the peak of the pulse pattern. The start of the charging pulse pattern actuates a logic circuit which produces a gating signal which terminates a fixed period after the time of the last of said charging pulses. The gating signal is differentiated to provide a pulse signal corresponding substantially to a fixed time after the center of said series of pulses.

The invention further discloses means for eliminating undesirable effects caused by the drop-out or absence of one or more nonsuccessive video pulses.

Other objects and features of this invention will be understood more clearly and fully from the following detailed description of the invention with reference to the accompanying drawings wherein:

FIG. 1 is a schematic diagram of a peak-time detecting circuit according to the invention;

FIG. 2 is a graph of a typical input voltage waveform;

FIG. 3 is a graph of voltage on the capacitor which is charged by the individual pulses of the waveform of FIG. 2;

FIG. 4 is the output waveform of the differential detector of FIG. 1;

FIG. 5 is the output waveform of the limiting amplifier shown in FIG. 1;

FIG. 6 is the input waveform to the differentiator shown in FIG. 1;

FIG. 7 is the differentiated output of the waveform shown in FIG. 6; and

FIG. 8 is a schematic diagram of a monostable multivibrator which may be used in place of the logic circuit shown in FIG. 1.

Referring to FIG. 1, there is shown a peak-time detection circuit 10, having an input terminal 11 to which is applied an input video signal 12 which may be provided by a radar or directional receiving system and which in this embodiment is shown comprising a series of pulses of ascending and descending amplitude, such as produced by scanning a beam of pulses of successive signals past a receiving location. The pulse pattern is fed to a differential detector 14 through a unidirectional current device, such as rectifying diode 16, a storage device in the form of charging capacitor 18, and a current-monitoring resistor 20 connected in series with the diode 16. For example, with a series of pulses .5 microsecond in width and 470 microseconds apart, the charging capacitor 18 can be approximately .002 mfd. and the monitoring resistor 20 is approximately 24 ohms. The input video pulse signal is shown in the waveform of FIG. 2. During each of the input video pulses, capacitor 18 becomes substantially fully charged to the peak voltage of that pulse, as shown in FIG. 3. Since the capacitor charging current also flows through monitoring resistor 20, the voltage across this resistor is proportional to the charging current and provides a series of pulses due to the charging current only as long as the input video pulse amplitude continues to rise. When the peak amplitude of the input video signal is reached, the capacitor no longer charges due to the action of diode 16 in conjunction with the decrease of the input pulse amplitude. Thus, the output voltage developed across resistor 20 drops to substantially zero immediately following the peak pulse, as shown in FIG. 4 and the output of the differential detector 14 becomes substantially zero after the charging of capacitor 18 has completed following the peak pulse. In order to ready the differential detector circuit for a subsequent burst of video input pulses following the peak pulse, the charge on capacitor 18 becomes discharged over a long time constant, preferably greater than the beam width, by means, for example, of a 10-megohm discharge resistor 22 connected in series with resistor 20 and capacitor 18. For typical values of the differential detector 14, the charging time constant, $Tc = (R_{DF} + r)(C)$ is preferably less than the input pulse width, and the discharge time constant $T_D$, wherein $$T_D = \left[ \frac{(R_{DR})(R)}{R_{DR}+R} \right][C]$$

is preferably several times greater than the series of pulses representing the antenna beamwidth, making this section of the circuit operate as a standard amplitude detector. However, instead of using the stored capacitor voltage as an output, resistor $r$ monitors the charging current pulses. In the above formula, $R_{DF}$ is the forward resistance of the diode 16, $R_{DR}$ is the reverse resistance of diode 16, $r$ is the resistance of the monitor resistor 20, $R$ is the resistance of the discharge resistor, and $C$ is the value of capacitor 18.

Referring again to FIG. 1, the output of the differential detector is fed to a conventional pulse amplifier and limiter 24 sometimes referred to as a limiting amplifier which amplifies the output pulses and clips them to a substantially constant amplitude, as shown in FIG. 5. These pulses are used as trigger pulses for actuating timing gate circuitry in logic section 26. The purpose of this section is to maintain a gating waveform at a fixed level as long as the limiting amplifier 24 provides a series of pulses, the last of which represents the peak of the video signal. However, since it is not immediately known which is the last limiter pulse until a period of at least 470 microseconds has occurred, it is desirable to provide a gating signal which will remain uninterrupted for a period slightly in excess of the interval between pulses. For example, with a time interval of approximately 470 microseconds betwen pulses in the video signal, the first pulse output from the limiting amplifier 24 triggers on a conventional one-shot or monostable multivibrator 28 which is preset to provide a substantially square wave gating pulse of approximately 500 microseconds, thus over-lapping the period between pulses. The output of multivibrator 28 is connected to an "and" gate 30 which requires the entrance of a subsequent limiter pulse in addition to the output of multivibrator 28 to gate or apply a second actuation pulse to a second monostable or one-shot multivibrator 32. The outputs of both multivibrators are fed to a conventional direct coupled "or" gate 34 which provides an output as long as either or both of the one-shot multivibrators is turned on. Thus, for each pulse either one or the other of the 500 microsecond gates is commenced. In this manner, a continuous stream of limiter pulses maintains one of the multivibrators in the "on" condition, that is, generating a continuous gating signal which is fed to an integrating and limiting network.

In the absence of a limiter pulse, following the passage of the peak of the video pattern, the multivibrator, which was turned on by the last pulse output of the limiting amplifier, for example, runs for its preset 500 microsecond period and then turns off, thereby terminating the gating waveform from "or" gate 34. The other multivibrator is not actuated, since there was no subsequent limiter pulse to be applied to the "and" gate and thus the first multivibrator terminates the gating signal, as shown in FIG. 6. The termination of this gating signal represents a fixed time, herein shown as 500 microseconds, after the highest amplitude video pulse, which occurs in effect, at substantially the peak amplitude of the video signal. The negative-going trailing edge 37 of the gate of FIG. 6, after passing through integrator and limiter 38, for specific purposes to be hereinafter described, and after amplification by amplifier 40, generates a short negative pulse in differentiator and clipper 42, corresponding to the negative output pulse at FIG. 7. Thus, differentiator and clipping circuit 42 differentiates the gating waveform shown in FIG. 6 and clips the positive-going pulse so that only the negative-going differentiated output is preserved. This output pulse coincides with a fixed time of, for example, 500 microseconds after the occurrence of the highest amplitude video pulse.

The invention further discloses an integrator and limiter circuit 38 which eliminates the undesirable effects caused by the drop-out or loss of one or more nonsuccessive pulses in the output of limiting amplifier 24. When such drop-out occurs, the gating waveform 36 becomes interrupted, and tends to cause two outputs from the differentiator and clipper, the first of which may be a false indication of the center or peak amplitude of the beam. For example, assuming a pulse has been dropped, the waveform 36 at the output of logic section 26 becomes interrupted, as shown by a dotted negative-going portion 44. Integrator-resistor 50 and capacitor 52 provide a relatively long time constant which does not permit the drop-out portion 44 of the gating waveform 36 to reach its zero-volt base line. Thus, in the absence of one pulse, the succeeding pulse causes this integrated waveform 54 to recover in the manner shown at 55.

The pulse is then limited in a limiter network comprising resistor 56, diode 58, and bias voltage source 60 which determines the limiting level. The limiter network in connection with amplifier 40 forms in one embodiment a conventional limiting amplifier such as, for example, limiting amplifier 24. Thus, for example, an amplifier operating from a twelve-volt supply would tend to limit all signals in excess of twelve volts. This limiter action only retains the bottom portion of the waveform and eliminates the top portion which was interrupted by the pulse drop-out. Thus, the amplified and limited signal output from amplifier 40 is essentially free of any interruption due to the drop-out of a pulse in the video train and appears in FIG. 6.

It should be understood that the logic section which provides a continuous gating pulse as long as there are successive pulses from limiting amplifier 24, can be replaced by a monostable multivibrator 64 or similar circuit shown in FIG. 8. Transistors 66 and 68, together with capacitor 70, load resistors 72 and 74, and timing resistor 76, coupling resistors 78 and 80 form a conventional monostable multivibrator which without additional circuit elements would produce a gating output waveform at terminal 81, the length of which depends on well known preset circuit values. The addition of diode 82, transistor 84, resistors 85 and 86, and capacitor 88, permits the multivibrator to remain in the reset condition by clamping capacitor 70 to the negative power supply voltage. Prior to the application of a pulse at input 90, the base of transistor 68 is connected to the positive voltage source via resistor 76, thus causing transistor 68 to normally conduct. Consequently, the output of transistor 68 remains at ground, and the voltage divider comprising resistors 78 and 80 is connected between ground and the negative voltage supply. This places a negative voltage at the base of transistor 66 and prevents its from conducting.

When the first limiter pulse is applied to input terminal 90, transistor 84 saturates so that the negative supply voltage appears at the base of transistor 68 holding at cut-off and causing the output terminal 81 to go positive. This also causes transistor 66 to saturate since the voltage divider, transistors 78 and 80, is now connected between a positive output terminal 81 and the negative voltage source. At the conclusion of the first limiter pulse, transistor 84 cuts off. Discharge of capacitor 70 normally would cause transistor 68 to conduct and terminate the waveform in a known manner. However, by continuously applying limiter pulses at terminal 90, the negative voltage on the base of transistor 68 is repetitively returned to the negative value of the supply voltage thus interrupting the discharge of capacitor 70 so that the transistor does not conduct. This is achieved by applying continuous limiting pulses to the base of transistor 84 through capacitor 88 and current limiting resistor 86. Each time a pulse is applied to the base of transistor 84, it becomes saturated and conducts fully, thus pulling its collector down to relatively the same voltage as its emitter, which is returned to the negative supply voltage. Diode 82 prevents its associated side of capacitor 70 from going negative as the other side of the capacitor is being pulled down by the collector of transistor 84 to the value of the negative supply voltage, thus holding the multivibrator output constant as long as a series of limiter pulses is applied. In the absence of a limiting pulse, the multivibrator runs for its preset period after the last input pulse from limiter 24 since the discharge of capacitor 70 is not interrupted and then terminates its output waveform. Thus, normal conditions are restored wherein transistor 68 is conducting and transistor 66 cut off. This terminated waveform is fed to the remaining circuitry to provide the output pulse which represents a fixed time after the occurrence of the highest amplitude video pulse.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:

1. A peak time-detecting circuit comprising a differential detector adapted to provide a series of charging pulses in response to a succession of pulses of increasing amplitude, each of said charging pulses having an amplitude proportional to the amount of increase in amplitude between one of said succession of pulses and the previous one;
    means for limiting the amplitude of said charging pulses;
    means for providing a continuous gating signal in response to an uninterrupted succession of said limited charging pulses, said gating signal starting at the beginning of said series of charging pulses;
    and means for terminating said gating signal a fixed period after the final pulse of said series.

2. A peak time detecting circuit comprising a differential detector including a capacitor adapted to provide a series of charging pulses in response to a succession of pulses of increasing amplitude;
    means for limiting the amplitude of said charging pulses;
    means for providing a continuous gating signal in response to an uninterrupted succession of said limited charging pulses;
    means for receiving and providing a relatively long time constant to said gating signal and operative to prevent interruption of said gating signal notwithstanding a drop-out of at least one of said pulses, and for terminating said gating signal a predetermined period after the final pulse of said series.

3. A peak time detecting circuit comprising unidirectional current means;
    storage means and resistive means connected in series with said unidirectional current means;
    said storage means being of a value to become charged by each pulse of a series of pulses of increasing amplitude to substantially the amplitude of said each pulse and connected in circuit with said unidirectional current means;
    said resistive means providing an output voltage signal in response to the charging of said storage means;
    means for discharging said storage means over a time constant greater than the duration of said series of pulses;
    means for providing a continuous gating signal in response to an uninterrupted session of output voltage signals;
    and means for terminating said gating signal a fixed period after the occurrence of the final pulse of said series.

4. A peak time detecting circuit comprising unidirectional current means;
    storage means and resistive means connected in series with said unidirectional current means;
    said storage means being of a value to become substantially fully charged by each pulse of a series of pulses of increasing amplitude connected in circuit with said unidirectional current means;
    said resistive means providing an output voltage signal in response to the charging of said storage means;
    means for discharging said storage means over a time constant greater than the duration of said series of pulses;
    means for providing a continuous gating signal in response to an uninterrupted succession of output voltage signals;
    means for receiving and providing a relatively long time constant to said gating signal and operative to prevent interruption of said gating signal notwithstanding a drop-out of at least one nonsuccessive pulse of said series, and for terminating said gating signal a fixed period after the occurrence of the final pulse of said series.

5. A peak time detecting circuit comprising a differential detector adapted to provide a series of charging pulses in response to a succession of pulses of increasing amplitude, each of said charging pulses having an amplitude proportional to the amount of increase in amplitude between one of said succession of pulses and the previous one;
    means for providing a continuous gating signal in response to an uninterrupted series of said charging pulses;
    means for terminating said gating signal a fixed period after the final pulse of said series, said latter means including a multivibrator adapted to remain in its unstable condition in response to said uninterrupted succession of said pulses;
    and a differentiating circuit adapted to differentiate the trailing edge of said gating signal to provide an output signal a predetermined time after the occurrence of the last pulse in said series of charging pulses.

6. In combination:
    unidirectional current means;
    storage means and resistive means connected in series with said unidirectional current means;
    said storage means being of a value to become substantially fully charged by each pulse of a series of pulses connected in circuit with said unidirectional current means;
    means for discharging said storage means over a time constant greater than the duration of said series of pulses;
    said resistive means providing an output trigger signal in response to the charging of said storage means;
    means in response to successive trigger signals for providing a gating signal which terminates in response to the absence of at least two consecutive output trigger signals;
    means for integrating and limiting said gating signal to prevent termination of said gating signal in response to the interruption of one of said charging pulses;
    and differentiation means operating upon the termination of said gating signal to provide an output signal representative of a fixed time interval from the occurrence of the last charging pulse in said series of pulses.

References Cited by the Examiner

UNITED STATES PATENTS

| 2,735,005 | 2/1956 | Steele | 328—41 |
| 2,834,883 | 5/1958 | Lukoff | 328—151 |
| 2,982,885 | 5/1961 | Becker | 328—58 |
| 3,093,756 | 6/1963 | Rywak | 307—88.5 |

DAVID J. GALVIN, *Primary Examiner.*